(12) United States Patent
Zhou

(10) Patent No.: US 12,726,441 B2
(45) Date of Patent: Sep. 1, 2026

(54) CROSS-CONGESTION NOTIFICATION

(71) Applicant: Charter Communications Operating, LLC, St. Louis, MO (US)

(72) Inventor: Lei Zhou, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 56 days.

(21) Appl. No.: 19/043,800

(22) Filed: Feb. 3, 2025

(65) Prior Publication Data

US 2026/0230430 A1 Aug. 6, 2026

(51) Int. Cl.

*H04L 47/11* (2022.01)
*H04L 47/32* (2022.01)
*H04L 69/22* (2022.01)

(52) U.S. Cl.

CPC .......... *H04L 47/115* (2013.01); *H04L 47/323* (2013.01); *H04L 69/22* (2013.01)

(58) Field of Classification Search

CPC ....... H04L 47/115; H04L 47/10; H04L 47/12; H04L 47/20; H04L 47/24; H04L 47/323; H04L 1/18; H04L 45/74; H04L 69/22; H04L 69/16; H04W 28/02

See application file for complete search history.

(56) References Cited

U.S. PATENT DOCUMENTS 6,535,482 B1 * 3/2003 Hadi Salim ............. H04L 47/33 370/236
9,386,128 B2 * 7/2016 Ehsan ................... H04W 28/10
2015/0016249 A1 * 1/2015 Mukundan .............. H04L 12/66 370/230
2015/0117230 A1 * 4/2015 Cui ....................... H04W 48/06 370/252
2015/0146527 A1 * 5/2015 Kishore ................ H04L 47/115 370/230.1
2017/0134186 A1 * 5/2017 Mukundan .............. H04L 45/24
2020/0322837 A1 * 10/2020 Mihály ............. H04W 28/0284
2022/0217078 A1 * 7/2022 Ford ................... G06F 13/1642
2024/0089791 A1 * 3/2024 Huang .................. H04W 28/02
2024/0129234 A1 * 4/2024 Farrokhbakht ..... G06F 12/0802

(Continued)

FOREIGN PATENT DOCUMENTS

WO WO-2020236297 A1 * 11/2020 ............. H04L 69/40

OTHER PUBLICATIONS

Ramakrishnan et al., "RFC 3168: The Addition of Explicit Congestion Notification (ECN) to IP." Sep. 2001. (Year: 2001).*

(Continued)

*Primary Examiner* — Alina A Boutah

(74) *Attorney, Agent, or Firm* — Mendelsohn Dunleavy, P.C.; Steve Mendelsohn

(57) ABSTRACT

For a flow of data packets in a communication path from a source host to a destination host, an intermediate node forwards data packets transmitted by the source host on a downstream link towards the destination host; forwards, towards the source host, acknowledgment (ACK) packets transmitted by the destination host in response to receiving the data packets; detects congestion in the downstream link; and directly modifies at least some of the ACK packets to inform the source host of the congestion. ACK-packet modification may include marking, dropping, and/or delaying at least some of the ACK packets.

18 Claims, 4 Drawing Sheets

(56) References Cited

U.S. PATENT DOCUMENTS

| | | | | |
|---|---|---|---|---|
| 2024/0414087 | A1* | 12/2024 | Ranjan | H04L 47/125 |
| 2025/0119384 | A1* | 4/2025 | Farrokhbakht | H04L 49/109 |
| 2025/0254119 | A1* | 8/2025 | Toledo | H04L 43/50 |

OTHER PUBLICATIONS

Hadi Salim et al., Performance Evaluation of Explicit Congestion Notification (ECN) in IP Networks, Network Working Group, RFC 2884, Jul. 2000 (Year: 2000).*

Balakrishnan et al., "TCP Performance Implications of Network Path Asymmetry," Network Working Group Request for Comments: 3449, Dec. 2002. (Year: 2002).*

* cited by examiner

CROSS-CONGESTION NOTIFICATION

BACKGROUND

Field of the Disclosure

The present disclosure relates to computer networks and, more specifically but not exclusively, to the management of traffic flow in such networks.

Description of the Related Art

This section introduces aspects that may help facilitate a better understanding of the disclosure. Accordingly, the statements of this section are to be read in this light and are not to be understood as admissions about what is prior art or what is not prior art.

FIG. 1 is a block diagram representing an example flow 100 of data packets 112 from a source host 110 to a destination host 120 via an Internet Protocol (IP)-based computer network 130 that includes a CPE (Customer Premises Equipment) gateway 134 and a headend access device 138 at the source end of the flow 100, a series of routers 142 of a mesh network, and a headend access device 144 and CPE gateway 148 at the destination end of the flow 100. As shown in FIG. 1, each host 110/120 is connected to its associated CPE gateway 134/148 via a corresponding local network link 132/150, each CPE gateway 134/148 is also connected to its associated headend access device 138/144 via a corresponding access network link 136/146, and each router 142 is connected to its two adjacent nodes 138/142/144 via corresponding core network links 140. Those skilled in the art will understand that the routers 142 will typically be part of a larger, mesh network of interconnected routers that support concurrent flows of data between different source and destination hosts via different pairs of CPE gateways and headend access devices and their corresponding links, including possibly the reciprocal flow of data from the host 120 to the host 110 of FIG. 1 through the same or different series of routers and links.

As represented in FIG. 1, when a data packet 112 transmitted from the source host 110 as part of the flow 100 arrives at the destination host 120, the destination host 120 transmits an Acknowledgement (ACK) packet 122 back to the source host 110 to inform the source host 110 that that data packet 112 has been successfully received. According to the Transport Control Protocol (TCP), there are many schemes to send feedback of successful receptions of data packets 112 using ACK packets 122. For example, the destination host 120 can transmit an ACK packet 122 for each received data packet 112 or it can transmit an ACK packet 122 for a chunk of data packets 112 it has received. Each TCP data packet 112 sent by the source host 110 has a sequence number. The TCP ACK packet 122 will include a sequence number that can indicate either that the data packet 112 of that sequence number has been received by the destination host 120 or that all data packets 112 of up to that sequence number have been received by the destination host 120. Besides a packet sequence number, a TCP ACK packet 122 also includes identifications of the source host 110, the destination host 120, and the flow 100 that the TCP session is associated with. ACK packets 122 can, but do not necessarily, travel over the same network path (in the reverse direction) as the data packets 112.

Congestion control is a focal technique for stable and efficient operation of an IP-based network such as the network 130 of FIG. 1. The network links along the route between the two hosts 110 and 120, including the local network links 132 and 150, the access network links 136 and 146, and the core network links 140, are usually shared resources that may be used concurrently by different pairs of hosts for different data flows. When the cumulative data rate of the multiple pairs of communications exceeds the capacity of a link, that link becomes congested. A congested link will result in loss of data packets and/or transmission delays.

To avoid packet loss and/or delay, when one or more links along the route between a source host and a destination host become congested, the source host should be signaled to reduce its transmission rate. On the other hand, hosts should be allowed to communicate at full throttle to achieve maximum bandwidth utilizations when the links are freed up. This rate adaptation procedure is called congestion control. Congestion control can be performed in an end-to-end manner by the end hosts or at the link level by the CPE gateways, headend access devices, and routers in between.

Transport Control Protocol (TCP) is the dominant transport protocol used by IP traffic. TCP embeds an end-to-end congestion control mechanism. During the lifetime of a TCP session, the source host maintains a congestion window. The source host tries to maintain the number of packets in transit equal to the congestion window. Once the source host has sent out a congestion-window-worthy number of packets, the source host uses the arrival of an ACK packet replied from the destination host as a signal that one of the source host's sent packets has arrived at the destination host and that it is therefore now safe for the source host to inject a new packet into the network without adding to the level of congestion.

When the bandwidth or the latency of the route changes due to congestions, the source host could learn of those changes from the arrival rates and times of ACK packets and the receipt of duplicated ACK packets and then adjust the congestion window size accordingly to adapt its transmission rate to the congestion. The messaging and congestion control procedure of TCP is illustrated in FIG. 1 with the transmission of ACK packets 122 from the destination host 120 in response to the arrival of data packets 112 at the destination host 120. Many variations of TCP implement different congestion control algorithms at the source host 110 that infer the available bandwidth and latency from the arrival behavior of ACK packets to pace the source host's transmissions.

Active Queue Management (AQM) is a congestion avoidance technique using proactive congestion notifications. AQM is usually implemented on the CPE gateways, the headend access devices, and/or the routers. AQM detects congestion by monitoring the transmission buffer of the local device. When the buffer is being filled up by packets queued for transmissions, the device can choose to either drop incoming packets or mark the Explicit Congestion Notification (ECN) bits in the headers of incoming packets. There are two ECN bits in IP headers. AQM marks or drops incoming data packets by probability. As such, only some packets will be marked or dropped before that probability reaches one hundred percent in very extreme scenarios.

When a device drops one or more incoming packets, the rate of packets to be forwarded to the congested network link is reduced. Dropping of packets causes the destination host 120 to fail to send corresponding ACK packets and/or to send delayed or duplicated ACK packets, which eventually cause the source host 110 to adjust its transmission rate. Depending on the particular TCP implementation, the destination host 120 may stop sending ACK packets 122 while waiting for an expected data packet 112 or repeat sending ACK packets 122 for the last data packet 112 it has received. At the source host side, delayed or duplicated ACK packets 122 will be observed. If a flow 100 includes both data packets and ACK packets, the marked or dropped packets can include the ACK packets.

Those skilled in the art will understand that, if the flow 100 includes both data packets and ACK packets, the data packets will associated with one or more TCP sessions from the host 110 to the host 120, while the ACK packets will be associated with the one or more different TCP sessions from the host 120 to the host 110. Those skilled in the art will also understand that a given link, such as link 146, may carry data packets and/or ACK packets associated with one or more TCP sessions between one or more different pairs of hosts, including packets flowing in one direction and other packets flowing in the other direction for bidirectional links. If a bidirectional link is congested in one direction, it might or might not be congested in the other direction. Marking, delaying, and/or dropping both data and ACK packets can provide useful information to the receiving hosts.

When an intermediate device marks the ECN bits of incoming data packets (e.g., sets the ECN bit values to 1), the marked data packets give congestion signals to their individual destination hosts. Then the destination hosts can copy the marks into the ACK packets sent back to the source hosts. In this way, the source hosts learn of the congestion from the markings and adjust their transmission rates to avoid the congestion.

FIG. 2 is a block diagram representing the implementation of AQM 152 at the headend access device 144 in the network 130 of FIG. 1. Those skilled in that art will understand that analogous AQM processing may be implemented at multiple, different intermediate nodes, including possibly at all intermediate nodes. When the AQM 152 at the headend access device 144 determines that the access network link 146 to the CPE gateway 148 is congested, the headend access device 144 marks the ECN bits in the headers of a randomly selected subset of the data packets 112 to be transmitted on that link. When the marked data packets 114 eventually arrive at the destination host 120, the host destination 120 copies those ECN marks into the corresponding ACK packets 122 and transmits the resulting marked ACK packets 124 back to the source host 110. In response, upon receiving those marked ACK packets 124, the source host 110 determines that at least one link in the path 100 to the destination host 120 is congested (although the source host 110 does not know which link or links are congested) and throttles back its transmission rate to remove the congestion.

The packet-marking scheme of FIG. 2 requires all hosts to support ECN bits. TCP with ECN support is termed Low Latency Low Loss Scalable (L4S) throughput. AQM usually randomizes the marking or dropping operations with a probability that is a carefully designed function of the queue length and the estimated queuing delay.

Many AQM algorithms have been proposed, including Random Early Detection (RED), Controlled Delay (CoDel), Proportional Integral Controller Enhanced (PIE), and derivatives of them. The RED algorithm monitors the queue length and starts to mark and/or drop packets randomly when the queue length exceeds a threshold, wherein the probability of marking or dropping is proportional to the queue length. The CoDel and PIE algorithms determine the engagement of random marking or dropping based on predictions of the queueing delay, and the probability of marking or dropping is proportional to the estimated queueing delay.

SUMMARY

A conventional TCP congestion control strategy is a posterior measure in that it responds only after a congestion has already occurred. In fact, TCP repeatedly increases the load it imposes on the network in an effort to find the point at which a congestion occurs, and then it backs off from this point. A conventional AQM strategy tries to predict congestion and notify the source hosts before the congestions become adverse. However, the congestion notifications by a conventional AQM propagate to the destination host via marked data packets and then are fed back to the source host via marked ACK packets. This end-to-end nature causes delays in rate adaptations to congestions and may result in under-utilizations of network bandwidth and even instabilities of network throughput.

Problems in the prior art are addressed in accordance with the principles of the present disclosure by configuring an intermediate device that detects congestion to directly mark ACK packets, thereby reducing the delay in informing the source host of the congestion.

At least one embodiment of the present disclosure is an intermediate device for a communication path from a source host to a destination host that includes the intermediate node. The intermediate node (i) receives a downstream flow of data packets transmitted by the source node; (ii) transmits the downstream flow of data packets towards the destination node via the downstream link; (iii) receives an upstream flow of acknowledgment (ACK) packets transmitted by the destination node corresponding to the downstream flow of data packets received at the destination node; (iv) transmits the upstream flow of ACK packets towards the source node; (v) detects congestion in the downstream link; and (vi) modifies the upstream flow of ACK packets to inform the source node of the congestion in the downstream link.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
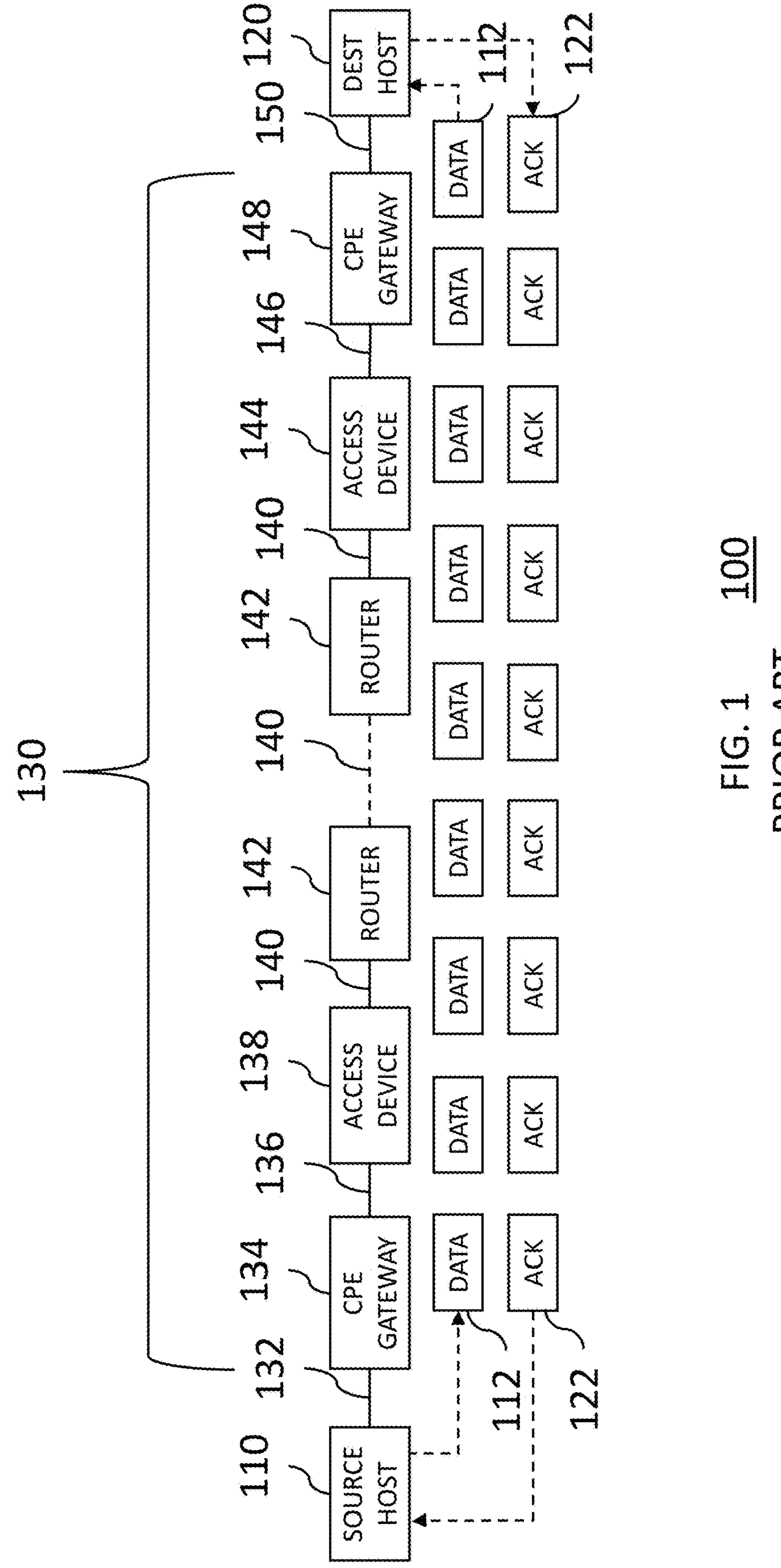
FIG. 1 is a block diagram representing an example flow of data packets from a source host to a destination host via an IP-based computer network.
Figure 3:
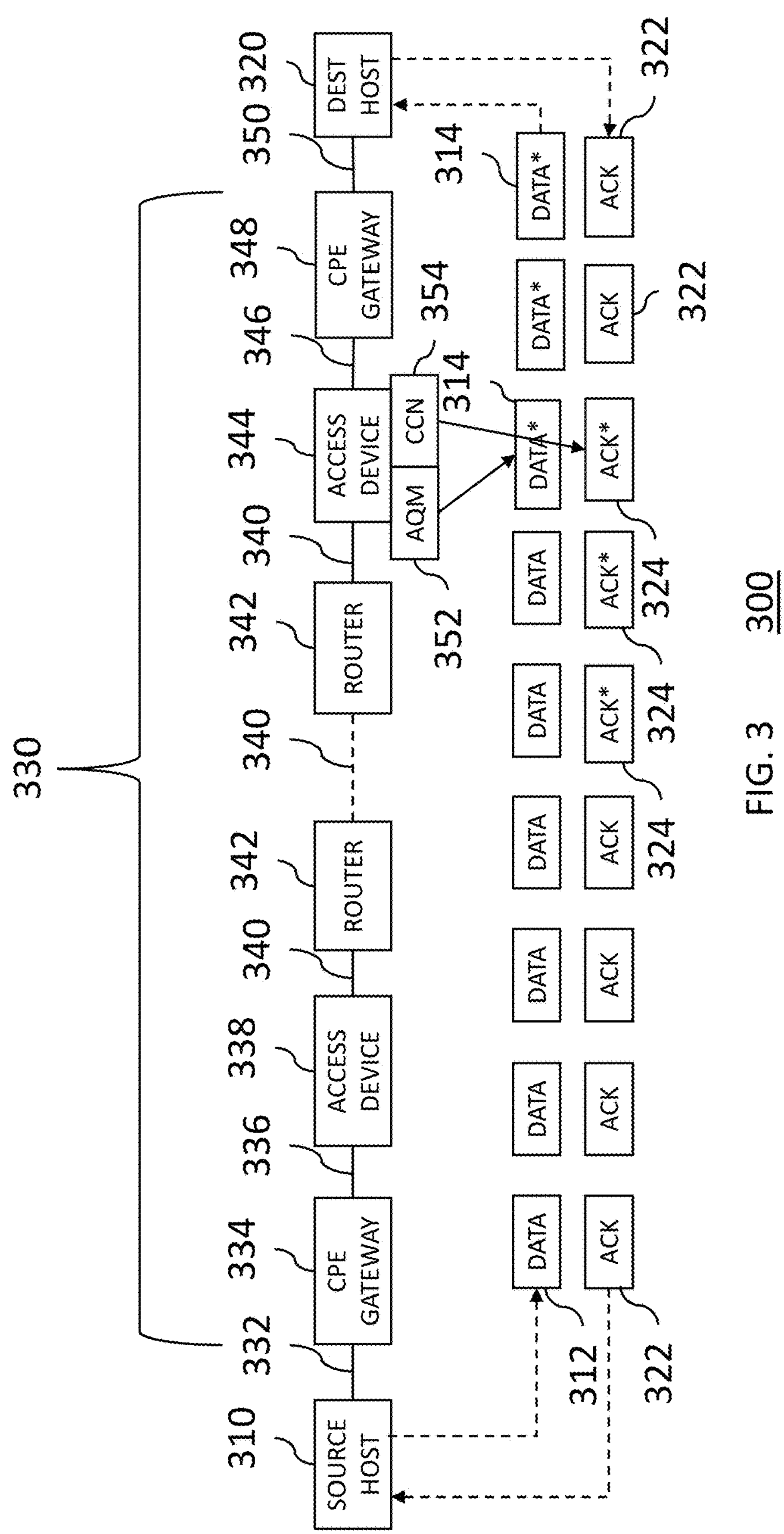
FIG. 3 is a block diagram representing an example flow of data packets from a source host to a destination host via an IP-based computer network, according to certain embodiments of the present disclosure.

FIG. 3 is a block diagram representing an example flow 300 of data packets 312 from a source host 310 to a destination host 320 via an IP-based computer network 330, according to certain embodiments of the present disclosure, where the computer network 330 is analogous to the computer network 130 of FIG. 1 with analogous elements having analogous labels. As represented in FIG. 3, the headend access device 344 implements AQM 352 with a cross-congestion notification (CCN) capability 354 that directly marks at least some of the ACK packets 322 that it receives from destination host 320 as soon as the device 344 determines that the link 346 to the CPE gateway Cl is congested (or getting close to being congested) and transmits the resulting marked ACK packets 324 to the source host 310. Those skilled in that art will understand that analogous AQM and CCN processing may be implemented at multiple, different intermediate nodes, including possibly at all intermediate nodes.

Figure 2:
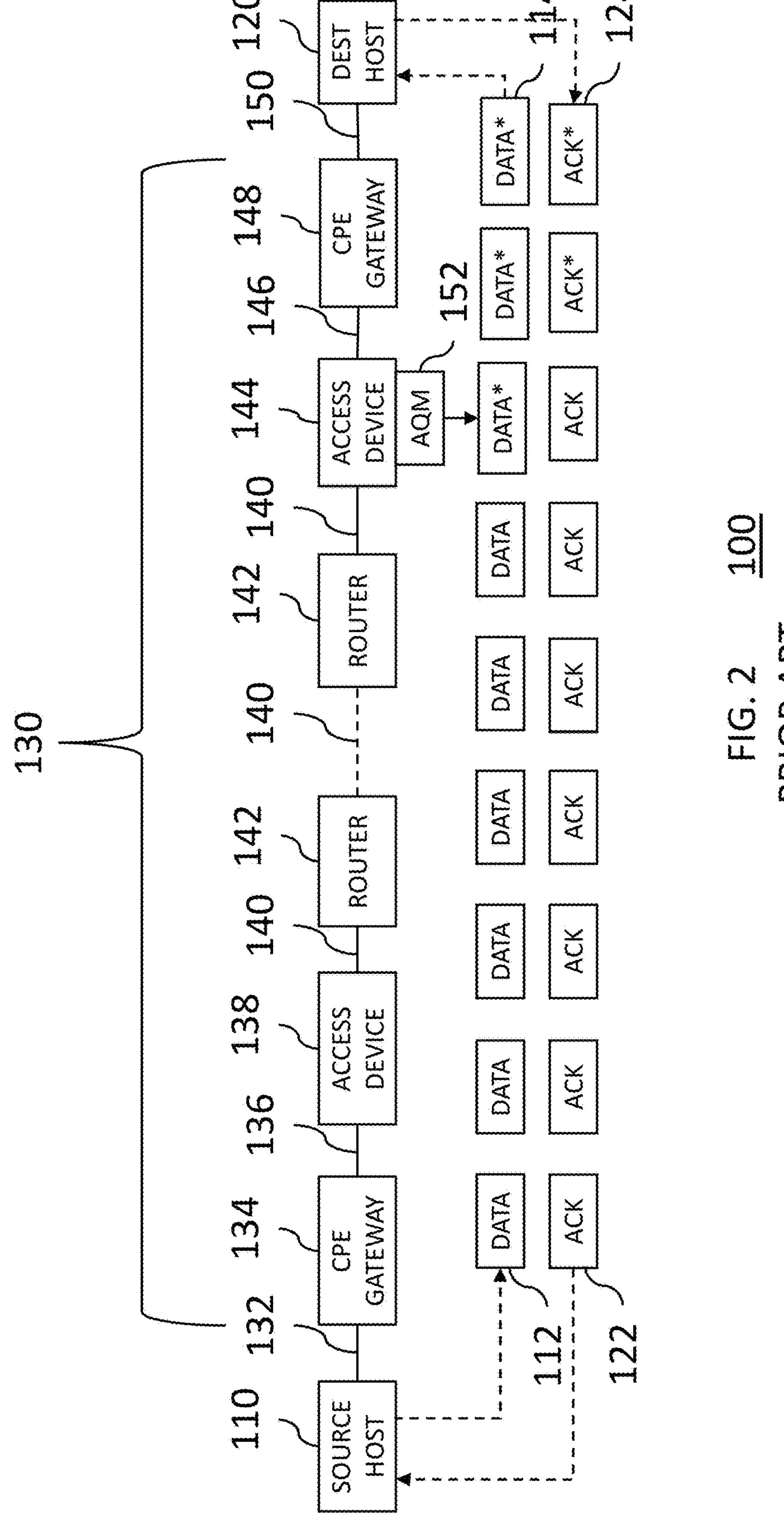
FIG. 2 is a block diagram representing the implementation of Active Queue Management (AQM) at a headend access device in the network of FIG. 1.

As such, whether or not the AQM 352 also marks data packets 312 transmitted to the destination host 320 and whether or not the destination host 320 marks ACK packets 322, at least some of the ACK packets transmitted by the device 344 to the source node 310 will be marked ACK packets 324. As such, the source host 310 will become aware of the downstream congestion sooner than with the conventional AQM processing of FIG. 2.

Note that the one or more initial, marked ACK packets 324 will correspond to data packets 312 that were forwarded by the device 344 before the congestion of link 346 was detected by the device 344.

For notational purposes, let the direction of transmissions from the source host 310 to the destination host 320 be the forward (i.e., downstream) direction and the direction from the destination host 320 to the source host 310 be the return (i.e., upstream) direction. The proposed CCN scheme of FIG. 3 follows a similar procedure as conventional AQM but applies packet markings to both the forward and return directions. The scheme includes (i) a conventional AQM module 352 implemented on the forward direction, performing the normal functions of marking/dropping/delaying packets according to estimates of the queue length or queueing delay and (ii) a cross-congestion notification (CCN) module 354 that takes the estimates of queue length or queueing delay output from the AQM module 352 and marks some or all ACK packets 322 transmitted from the destination host 320.

In addition to or instead of marking some or all ACK packets of all or only specific TCP sessions, the AQM 352 with cross-congestion notification 354 may do one or more of the following in response to congestion detection:

Randomly mark some or all data packets;

Randomly drop some or all data packets;

Randomly delay some or all data packets;

Randomly mark some or all ACK packets of all or only some specific TCP sessions;

Randomly drop some or all ACK packets of all or only some specific TCP sessions; and Randomly delay some or all ACK packets of all or only some specific TCP sessions.

The proposed cross-congestion notification scheme could employ any AQM algorithm on the forward direction. When the cross-congestion notification module 354 randomly marks or drops ACK packets on the return direction, it could use the same marking/dropping probability as what the AQM module 352 uses in marking/dropping packets on the forward direction. Alternatively, the cross-congestion notification module 354 could use a different algorithm of calculating the marking/dropping probability from estimates of the queue length or queueing latency. The proposed scheme does not limit the algorithms of calculating the marking/dropping probability.

When the cross-congestion notification module 354 randomly delays ACK packets on the return direction, the random delay means a holding time randomly chosen for each packet from a time window. The cross-congestion notification module 354 may calculate the time window from estimates of the queue length or queueing latency obtained from the AQM module 352. The proposed scheme does not limit the algorithms of calculating the time window or choosing holding time for the packets.

The cross-congestion notification module 354 can choose to mark, drop, or delay ACK packets or combinations of those actions to provide signals of congestion for different TCP congestion control mechanisms. For example, new L4S TCPs can make use of the ECN markings of the ACK packets, while classic TCPs use the events of ACK packets not arriving on time or missing to adjust transmission rate. The proposed scheme does not limit which actions should be implemented by the cross-congestion notification module 354.

The cross-congestion notification module 354 could apply marking, dropping, or delaying to all packets on the return direction. It could apply the actions only to the ACK packets if the network device can intercept the TCP header of packets and identify the packet types. It could also apply the actions strictly to the ACK packets that belong to those TCP sessions that cause congestions, if the AQM module 352 can distinguish the packets of different TCP sessions and score their contributions to the congestion. The proposed scheme does not require the capability of the network device 344 to distinguish packets or TCP sessions and does not specify whether the actions of marking, dropping, and delaying shall be applied to all or only selected packets on the return direction.

The innovation of the proposed cross-congestion notification scheme lies in that it can send congestion-notification signals on both directions of TCP connections right at the network device where congestions are occurring. With the scheme, the source host does not need to wait for congestion signals to propagate through a congested link and be carried back on ACKs from the destination host; instead, the source host receives signals from the congested link itself. Therefore, the source host can promptly adjust its transmission rate to adapt to congestion. Meanwhile, there are fewer packets being sent through the congested link that cause unnecessary bandwidth waste or extra latency. In particular, the disclosed cross-congestion notification technique promptly sends congestion signals to the source host, thereby making possible faster rate adaptions (i.e., reductions). As a result, there will be fewer packets pumped by the source host in response to a congestion event.

Figure 4:
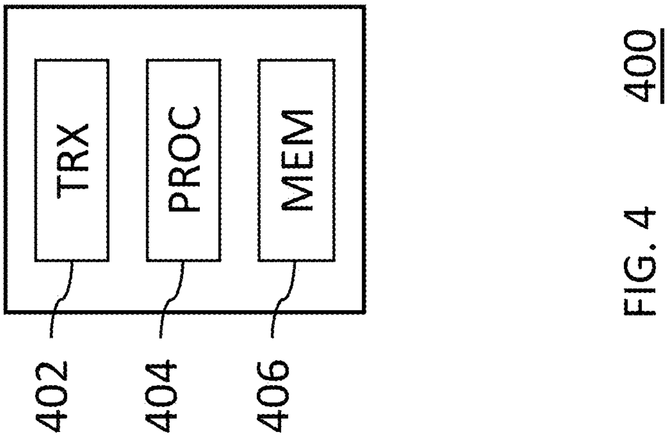
FIG. 4 is a simplified hardware block diagram of an example node that can be used to implement any of the nodes of FIG. 3.

FIG. 4 is a simplified hardware block diagram of an example node 400 that can be used to implement any of the nodes of FIG. 3. As shown in FIG. 4, the node 400 includes (i) communication hardware (e.g., wireless, wireline, and/or optical transceivers (TRX)) 402 that supports communications with other nodes, (ii) one or more processors (e.g., CPU and/or GPU microprocessors) 404 that control the operations of the node 400 and/or process data within the node 400, and (iii) one or more memories (e.g., RAM, ROM) 406 that store code executed by the processors 404 and/or data generated and/or received by the node 400.

In certain embodiments, the present disclosure is an intermediate node for a communication path from a source host to a destination host that includes the intermediate node, the intermediate node having a downstream link towards the destination host. The intermediate node comprises a memory and at least one processor, coupled to the memory and operative to cause the intermediate node to (i) receive a downstream flow of data packets transmitted by the source node; (ii) transmit the downstream flow of data packets towards the destination node via the downstream link; (iii) receive an upstream flow of acknowledgment (ACK) packets transmitted by the destination node corresponding to the downstream flow of data packets received at the destination node; (iv) transmit the upstream flow of ACK packets towards the source node; (v) detect congestion in the downstream link; and (vi) modify the upstream flow of ACK packets to inform the source node of the congestion in the downstream link.

In at least some of the above embodiments, the intermediate node is one of a gateway, an access device, and a router.

In at least some of the above embodiments, the intermediate node is configured to mark one or more of the ACK packets to indicate the congestion.

In at least some of the above embodiments, the intermediate node is configured to mark the one or more ACK packets by setting an Explicit Congestion Notification (ECN) bit in a header of the one or more ACK packets.

In at least some of the above embodiments, the intermediate node is configured to drop one or more of the ACK packets to indicate the congestion.

In at least some of the above embodiments, the intermediate node is configured to delay one or more of the ACK packets to indicate the congestion.

In at least some of the above embodiments, the intermediate node is further configured to mark one or more of the data packets to indicate the congestion.

In at least some of the above embodiments, the intermediate node is further configured to drop one or more of the data packets to indicate the congestion.

In at least some of the above embodiments, the intermediate node is further configured to delay one or more of the data packets to indicate the congestion.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure.

As used herein in reference to an element and a standard, the terms "compatible" and "conform" mean that the element communicates with other elements in a manner wholly or partially specified by the standard and would be recognized by other elements as sufficiently capable of communicating with the other elements in the manner specified by the standard. A compatible or conforming element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits. The term "non-transitory," as used herein, is a limitation of the medium itself (i.e., tangible, not a signal) as opposed to a limitation on data storage persistency (e.g., RAM vs. ROM).

Signals and corresponding terminals, nodes, ports, links, interfaces, or paths may be referred to by the same name and/or label and are interchangeable for purposes here.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. An intermediate node for a communication path from a source host to a destination host that includes the intermediate node, the intermediate node having a downstream link towards the destination host, the intermediate node comprising a memory and at least one processor, coupled to the memory and operative to cause the intermediate node to:

receive a downstream flow of data packets transmitted by the source node;

transmit the downstream flow of data packets towards the destination node via the downstream link;

receive an upstream flow of acknowledgment (ACK) packets transmitted by the destination node corresponding to the downstream flow of data packets received at the destination node;

transmit the upstream flow of ACK packets towards the source node;

detect congestion in the downstream link; and modify the upstream flow of ACK packets to inform the source node of the congestion in the downstream link.

2. The intermediate node of claim 1, wherein the intermediate node is one of a gateway, an access device, and a router.

3. The intermediate node of claim 1, wherein the intermediate node is configured to mark one or more of the ACK packets to indicate the congestion.

4. The intermediate node of claim 3, wherein the intermediate node is configured to mark the one or more ACK packets by setting an Explicit Congestion Notification (ECN) bit in a header of the one or more ACK packets.

5. The intermediate node of claim 1, wherein the intermediate node is configured to drop one or more of the ACK packets to indicate the congestion.

6. The intermediate node of claim 1, wherein the intermediate node is configured to delay one or more of the ACK packets to indicate the congestion.

7. The intermediate node of claim 1, wherein the intermediate node is further configured to mark one or more of the data packets to indicate the congestion.

8. The intermediate node of claim 1, wherein the intermediate node is further configured to drop one or more of the data packets to indicate the congestion.

9. The intermediate node of claim 1, wherein the intermediate node is further configured to delay one or more of the data packets to indicate the congestion.

10. A method for an intermediate node for a communication path from a source host to a destination host that includes the intermediate node, the intermediate node having a downstream link towards the destination host, the method comprising the intermediate node:

receiving a downstream flow of data packets transmitted by the source node;

transmitting the downstream flow of data packets towards the destination node via the downstream link;

receiving an upstream flow of ACK packets transmitted by the destination node corresponding to the downstream flow of data packets received at the destination node;

transmitting the upstream flow of ACK packets towards the source node;

detecting congestion in the downstream link; and modifying the upstream flow of ACK packets to inform the source node of the congestion in the downstream link.

11. The method of claim 10, wherein the intermediate node is one of a gateway, an access device, and a router.

12. The method of claim 10, wherein the intermediate node marks one or more of the ACK packets to indicate the congestion.

13. The method of claim 12, wherein the intermediate node marks the one or more ACK packets by setting an ECN bit in a header of the one or more ACK packets.

14. The method of claim 10, wherein the intermediate node drops one or more of the ACK packets to indicate the congestion.

15. The method of claim 10, wherein the intermediate node delays one or more of the ACK packets to indicate the congestion.

16. The method of claim 10, wherein the intermediate node marks one or more of the data packets to indicate the congestion.

17. The method of claim 10, wherein the intermediate node drops one or more of the data packets to indicate the congestion.

18. The method of claim 10, wherein the intermediate node delays one or more of the data packets to indicate the congestion.

* * * * *